Feb. 13, 1968  T. R. BOYD  3,368,602
SELF-LOCKING CAPTIVE SCREW ASSEMBLY
Filed April 1, 1966  2 Sheets-Sheet 1
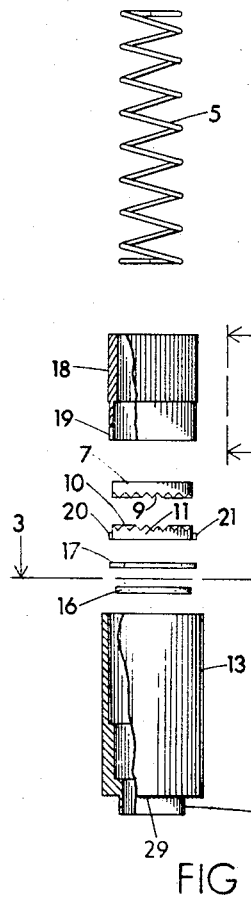
FIG 1
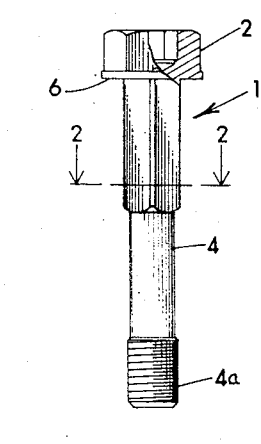
FIG 2
FIG 3
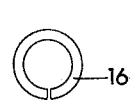
FIG 4
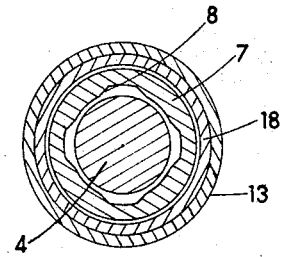
FIG 7
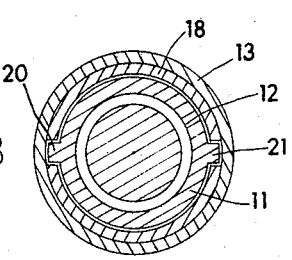
FIG 8
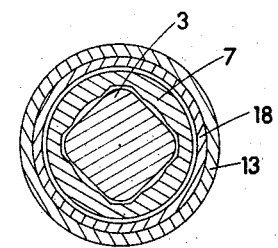
FIG 9
FIG 10
INVENTOR:
THOMAS R. BOYD
BY:
Arthur W. Fuzak
ATTORNEY Feb. 13, 1968  T. R. BOYD  3,368,602
SELF-LOCKING CAPTIVE SCREW ASSEMBLY
Filed April 1, 1966  2 Sheets-Sheet 2

INVENTOR:
THOMAS R. BOYD
BY:
ATTORNEY

United States Patent Office
3,368,602
Patented Feb. 13, 1968

3,368,602
SELF-LOCKING CAPTIVE SCREW ASSEMBLY
Thomas R. Boyd, Rolling Hills, Calif., assignor, by mesne assignments, to Tridair Industries, Redondo Beach, Calif.
Filed Apr. 1, 1966, Ser. No. 539,335
6 Claims. (Cl. 151—13)

ABSTRACT OF THE DISCLOSURE

This disclosure describes a fastener assembly including a screw, a nut, and means for preventing the nut and screw from unintentionally separating in response to vibrational forces. In the specific embodiment illustrated this last mentioned means includes a pair of ratchet plates, one of which is fixed against rotation and the other of which is rotatable with the screw. The ratchet plates are resiliently held together and the screw is preferably resiliently urged axially relative to the nut.

---

This invention relates to captive fastener assemblies and is more specifically concerned with positive acting, self-locking, vibration proof, captive screws.

Although captive fasteners have been long known and used for the purpose of fastening modular assemblies containing electronic and other devices to panels, frames and cabinets and although efforts have been made to assure complete locking of these fasteners to the threaded members which receive them, the locking means used in association with these fasteners have proven to be unsatisfactory in many environments and do not effectively and reliably perform the function intended.

Under many conditions of use of captive fasteners, the entire frame, panel or cabinet to which they are secured is subject to extreme vibrational frequencies and forces. The problem is particularly acute in the aerospace and missile industries where severe environmental conditions define stringent structural and reliability requirements.

Prior captive fasteners have employed such expedients as deforming the bolt or nut threads, or incorporating strip inserts made of nylon or other plastic in the thread segment of the screw or nut. Another commonly employed expedient is the use of a frictionally engaging lock washer. None of these solutions are completely satisfactory.

Under most conditions, the captive fastener must be capable of a great number of repeated fastening and unfastening cycles. In many environments it must also be capable of withstanding extreme temperatures, and must not become unfastened under vibrational stresses.

Captive screws that employ plastic inserts for locking purposes, or which require the use of deformed threads or frictionally engageable washers do not fulfill the foregoing requirements. Such expedients either do not permit repeated cyclical use of the screw, or cannot be used for high temperature screws, or the mating surfaces become damaged after short-term use, or the screw locking mechanism becomes unreliable after a relatively short period of use.

It is, therefore, a principal object of my invention to provide a captive fastener assembly that satisfies the above requirements for a self-locking fastener and that may be employed under the severest of environmental conditions.

It is a further object of my invention to provide a captive self-locking fastener that can be locked over a wide range of axial movement of the stud or screw and can thus accomplish locking of a module or other member to a panel, frame or cabinet even though the mating surfaces have not been tightened together.

It is another object of my invention to provide a self-locking captive fastener in which the locking features are entirely associated with the screw and which will perform a locking function with any mating threaded hole or nut.

Yet a further object of my invention is to provide a self-locking captive screw that can be used as a self-locking lead screw.

I also desire to provide a captive screw that can be readily and economically manufactured and that can be easily and simply secured in a locked position in a threaded hole or nut.

An additional object of my invention is to furnish a self-locking captive screw that locks against extremes of shock and vibration substantially independently of the torque applied to the stud in applying the fastener.

Another object of my invention is to provide a fastener assembly in which the screw can be removed from its threaded hole or nut and reassembled repeatedly, substantially without wear or change and yet can be assembled with any degree of rotational torque desired, from finger torque to torque loads approaching the strength of the materials used.

Yet another object of my invention is to provide a captive, self-locking screw where the locking torque prevails throughout the entire locking operation of the screw.

These as well as further objects of my invention will become apparent from a consideration of the following specification as related to the drawings in which:

FIG. 1 is an exploded elevation, partly in section, of my fastener illustrating the elements of which it is constructed;

FIGS. 2 and 3 are cross sections taken on lines 2—2 and 3—3 respectively of FIG. 1;

FIG. 4 is a side elevation taken on lines 4—4 of the internal sleeve of my fastener;

Figure 5:
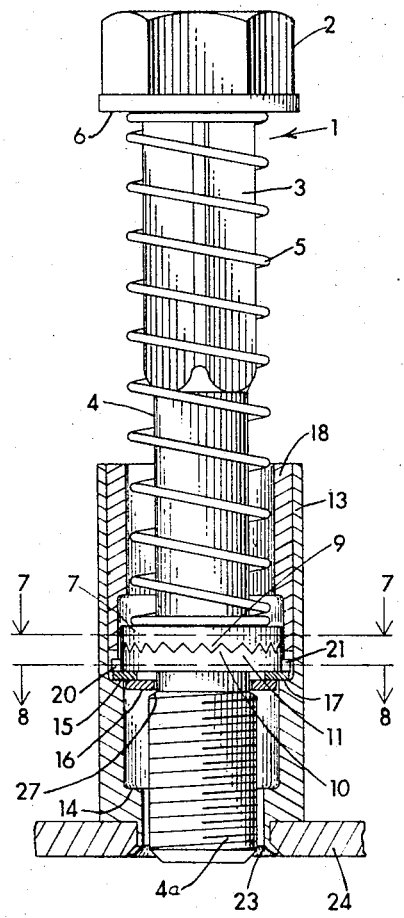
FIG. 5 is a side elevation, partly in section, of the captive screw of my invention illustrated in a retracted position.
Figure 6:
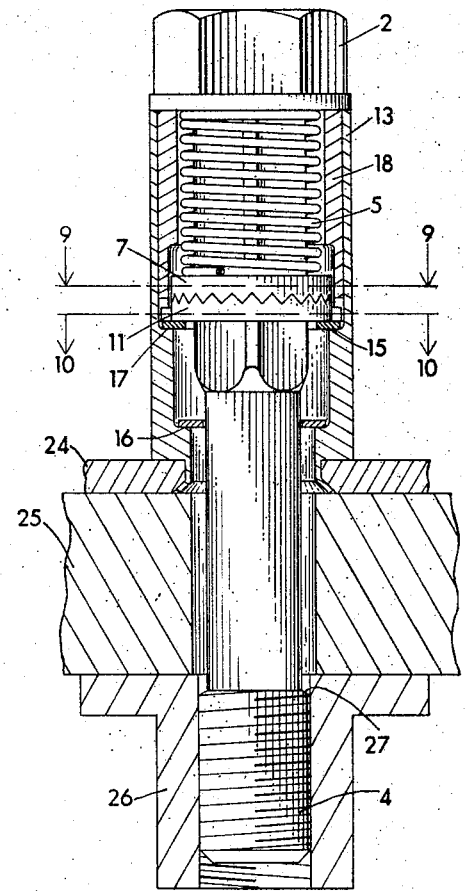
FIG. 6 is a side elevation, partly in section, of the captive screw of my invention illustrated in installed position.

FIGS. 7 and 8 are sectional views taken on the lines 7—7 and 8—8 respectively of FIG. 5, and FIGS. 9 and 10 are sectional views respectively taken on the lines 9—9 and 10—10 of FIG. 6.

The fastener of my invention generally comprises a tubular housing which may be secured to a panel or other member in any suitable fashion and which retains a threaded screw having an angular drive shank portion adjacent to the head. The screw is retained in the housing in a retracted position by means of a spring which bears on the head of the screw and on mating ratchet plates; one of which is provided with an angular opening conforming to the shape of the drive portion of the screw and the other of which has a circular opening. The ratchet plate with a circular opening is retained in the housing by means of a slotted press-fit sleeve, and a washer is provided to retain the screw in the housing.

Referring now to the drawings, the bolt or screw 1 has a head 2, an angular drive shank neck 3, which may have a square cross section as illustrated in FIG. 2, an intermediate, cross-sectionally circular segment 4 and a threaded end 4a. The head configuration may take any conventional or desired form, but is shown as a hex, having a hex recess. In the assembled position of the fastener, shown in FIG. 5, a coil spring 5 extends between the annular shoulder 6 defined by the head of the bolt and the flat surface of the ratchet plate 7. As will be seen in FIG. 7, this ratchet plate is provided with an angular drive opening 8, shown as a square opening, which conforms to the shape of the angular drive shank segment of the screw 1. The ratchet plate 7 is provided with a plurality of depending teeth 9, which engage and mesh with the teeth 10 of the lower ratchet plate 11. As seen in FIG. 8, this ratchet plate has a circular opening 12 of sufficient diameter to permit passage therethrough of the angular drive shank segment 3 of the screw and threaded end 4a.

The screw, spring and ratchet plates are retained within the tubular housing 13, which, in the configuration shown, is provided with three concentric bores of different diameter to define a lower internal annular shoulder 14 and an intermediate annular shoulder 15.

A screw captivating split ring washer 16, having an outside diameter such that the washer will not be retained by shoulder 15, but will be retained by annular shoulder 14, engages the screw adjacent to the threads 4a of the screw. Internally adjacent to this washer 16, is the ratchet plate captivating washer 17. This washer is of such diameter as to abut the intermediate annular shoulder 15. The opening in this washer is substantially the same size as the opening in the lower ratchet plate 11 so that the upper angular drive shank segment of the bolt can reciprocate axially through this washer.

It will be noted that the internal diameter of coil spring 5, the angular opening 8 in upper ratchet plate 7, the circular opening 12 in lower ratchet plate 11, and the opening in the ratchet plate captivating washer 17, are of sufficient size to permit the threaded end 4a of bolt 1 to be extended therethrough. On the other hand, it will be seen that screw captivating washer 16 has an internal diameter which is less than the external diameter of the threads, but is large enough for the washer to slidingly engage the intermediate segment 4 of the screw 1. As shown in FIG. 3, screw captivating washer 16 is a split ring washer which can be opened to engage the intermediate circular portion 4 of screw 1.

An internal sleeve 18 has an outside diameter such as to permit the sleeve 18 to be pressed into and retained by the housing 13. One end of the sleeve 18 is provided with a pair of diagonally opposed slots 19. These slots engage the opposed tabs 20 and 21 comprising a portion of the lower ratchet plate 11. The outer surface of the sleve 18 may be knurled as at 22, if desired, in order to provide for better frictional engagement with the housing 13.

As will be evident from FIGS. 5 and 6, the internal sleeve 18 retains the lower ratchet plate 11 in fixed vertical as well as rotational position with respect to the housing. Ratchet plate 11 is substantially locked against rotation and vertical movement by the tabs 20 and 21 and by engagement of the slotted sleeve 18 against the ratchet captivating washer 17, which, in turn, is retained against the housing shoulder 15. It will, however, be clear that this washer is not essential since this shoulder can be made to extend inwardly a sufficient distance to support and retain the lower ratchet plate 11 directly. Its use is preferred in order to provide a larger bearing surface for the washer 16.

The captivating washer 16 retains the screw 1 in its captivated position within the housing 13. This washer abuts the shoulder 27 defined by the end of the screw threads 4a, and captivates the screw by abutting against retaining washer 17, or in the event this washer is not employed, against the lower face of ratchet plate 11. When the screw is installed and the threaded end 4a is extended beyond the end of the housing, the screw captivating washer 16 is supported on shoulder 14.

The housing is provided at its lower end with an end segment 23, which may be swaged to the panel 24, as is well known in the art, in order to captivate the housing 13 to the panel 24. The annular base of this housing 29 may be knurled as shown in order to resist the tendency of the housing to rotate when swaged. Alternatively, the lower end of the housing may be internally threaded to receive a hollow bore screw which can retain the housing to a panel as shown, for example, in FIG. 2 of my U.S. Patent No. 3,059,736.

The fastener of my invention is assembled by inserting the threaded end of the bolt through coil spring 5, then through internal sleeve 18, ratchet plates 7 and 11 and through ratchet plate captivating washer 17. The split ring screw captivating washer 16 is then opened and snapped over the intermediate circular shank 4 to retain all of the foregoing elements on the screw 1. The coil spring urges these elements against the shoulder 27 formed by the end of screw threads 4a, and the intermediate segment 4.

Alternatively, the fastener could be assembled by utilizing a screw blank before the threads are formed, by telescoping all of the foregoing parts, except washer 16, on the screw and within the housing and then engaging the washer 16, depressing the bolt against the housing and then rolling the threads.

In operation, and as shown in FIG. 6, the panel 24 is to be secured to the panel 25, which may constitute a portion of a cabinet, frame or other member, by means of my captive screw and the nut 26. After the mating surfaces of the panel 24 and 25 have been brought into contact with one another, the head 2 of my captive screw is urged downwardly in an axial direction towards the nut 26 and against tension of coil spring 5. At the same time, the head 2 of the screw may be turned in order that the angular drive shank segment 3 may be aligned with the angular drive opening 8 of the ratchet plate 7. As soon as the ends of the thread segment 4a engage the threads of nut 26 and the head 2 is turned, the torque applied to the head is transmitted through the angular drive shank segment 3 to ratchet plate 7 by means of the angular drive opening 8. This ratchet plate reciprocates axially upon rotation a distance equal to the depth of its teeth 10 against the tension of the coil spring 5. It will be seen that the amount of torque required to rotate ratchet plate 7, with respect to the fixed ratchet plate 11, depends upon the depth of the mating teeth 9 and 10, their included angle, and the strength of the coil spring 5. In any event, since the coil spring 5 constantly bears on and urges ratchet plate 7 into contact with ratchet plate 11, the captive screw of my invention will not rotate while the ratchet plate 11 is in engagement with the angular drive shank of the screw unless a rotational torque is applied to the head of the bolt.

It will be evident that the total thickness of the mating panels which it is desired to secure by means of my captive fastener depends upon the respective axial lengths of the circularly cross sectional intermediate segment of the screw, the angular drive segment and the threaded end thereof. It will similarly be seen that the axial range through which the screw of my invention can be locked against vibrational or accidental rotation depends upon the axial distance between the ratchet plate 7 and shoulder 15. Alternatively, the locking range can be established by the height of the housing 13 above the upper ratchet plate 7.

Although I have described the preferred embodiment of my invention, it will be evident to those skilled in the art that various modifications may be made without departing from the scope and spirit of my invention.

The essential elements of my captive screw are comprised of a screw having a drive neck and a threaded end, a telescoping housing, a pair of ratchet plates, one of which is secured to the housing and has a circular opening and the other of which has an opening conforming to the shape of the drive neck of the screw, spring means urging the ratchet plates into engagement with one another, and means for retaining the screw in telescoping relation with the ratchet plates and housing.

While the preferred embodiment of my invention has been described in detail, it will be evident that my invention is not limited to the particular construction shown, and it is hereby intended to cover all modifications, vari-

I claim:
1. A fastener usable with various kinds of nuts comprising:
a screw having a head, a threaded end portion, and a neck intermediate said head and said threaded end portion, said neck having drive means thereon;
a housing for at least partially receiving said screw;
first and second ratchet plates within said housing, said ratchet plates having engageable teeth thereon;
said first ratchet plate having an opening therein generally conforming to the cross sectional shape of said drive means for drivingly receiving said drive means to thereby drivingly interconnect said first ratchet plate and said screw;
said second ratchet plate having an opening therein of sufficient size to permit rotation of said drive means when said drive means of said screw is received therein, said screw extending through said openings in said ratchet plates;
means for fixing said second ratchet plate against rotation and for at least substantially preventing movement of said second ratchet plate axially away from said head of said screw;
spring means for urging said ratchet plates into engagement with each other and for urging said head of said screw away from said ratchet plates; and
means for restraining said screw against withdrawal from said housing.

2. The fastener of claim 1 that further comprises means for securing said housing to a panel.

3. The fastener of claim 1 wherein said spring means comprises a coil spring in telescopic relationship with said screw and having one end thereof in engagement with the head of said screw and the other end in engagement with said first ratchet plate.

4. The fastener of claim 1 that further comprises an internal bore within said housing, a sleeve member in press-fit engagement with the internal bore of said housing, said second ratchet plate having a plurality of circumferential tabs thereon and said sleeve having a corresponding plurality of slots therein, said tabs extending within said slots and restraining said second ratchet plate against rotation.

5. The fastener of claim 4 wherein said screw has a cross-sectionally circular segment intermediately of said neck and said threaded end portion and wherein said means for restraining said screw comprises a washer which slidably engages said intermediate segment and abuts against said threaded end portion adjacent to said second ratchet plate.

6. A self-locking captive screw comprising:
(a) a screw having a threaded end and a neck segment having a noncircular cross-sectional shape, said threaded end terminating inwardly in a first shoulder;
(b) a coil spring retained on said screw in telescopic engagement therewith;
(c) a first ratchet plate having an opening generally corresponding to the noncircular cross-sectional shape of said neck segment and being retained on said screw in telescopic engagement therewith, said ratchet plate having an annular face with a plurality of ratchet teeth thereon;
(d) a second ratchet plate having a circular opening and being retained on said screw in telescopic engagement therewith, said second ratchet plate having an annular face with a plurality of ratchet teeth thereon in engagement with the teeth of said first ratchet plate and having a plurality of tabs extending circumferentially therefrom;
(e) a housing having an internal annular shoulder intermediately of the ends thereof,
(f) a sleeve mounted within said housing and engaging said tabs adjacent said annular shoulder, and
(g) a retaining washer slidably engaging said screw and being engageable with the first shoulder, said coil spring engaging the head of said screw at one end thereof and engaging said first ratchet plate to urge said ratchet plates into mutual engagement and to urge said screw head away from said ratchet plate.

References Cited

UNITED STATES PATENTS

| 1,246,353 | 11/1917 | Thigpen | 151—13 |
| 1,646,805 | 10/1927 | Bell | 151—39 |
| 2,737,222 | 3/1956 | Becker | 151—41.5 |
| 2,756,796 | 7/1956 | Murphy | 151—41.5 |
| 2,931,087 | 4/1960 | Farrar et al. | 151—41.5 |
| 3,037,542 | 6/1962 | Boyd | 151—41.5 |
| 3,204,680 | 9/1965 | Barry | 151—69 |
| 3,294,140 | 12/1966 | Cosenza | 151—69 |
| 3,250,559 | 5/1966 | Sommerfeld | 151—69 |

FOREIGN PATENTS

| 720,884 | 12/1954 | Great Britain. |
| 1,026,339 | 2/1953 | France. |

MARION PARSONS, JR., *Primary Examiner.*